United States Patent [19]
Axelrod

[11] Patent Number: 4,924,811
[45] Date of Patent: May 15, 1990

[54] THERAPEUTIC DEVICE FOR CLEANING THE TEETH OF DOGS

[76] Inventor: Herbert R. Axelrod, 211 W. Sylvania Ave., Neptune, N.J. 07753

[21] Appl. No.: 278,247

[22] Filed: Nov. 30, 1988

[51] Int. Cl.$^5$ ............................................. A01K 15/00
[52] U.S. Cl. .......................................... 119/29; 433/1; 132/323
[58] Field of Search ............................. 433/1; 119/29; 128/62 A; 132/323

[56] References Cited

U.S. PATENT DOCUMENTS

| | | | |
|---|---|---|---|
| 1,149,170 | 8/1915 | Allis | 119/29 |
| 3,476,086 | 11/1969 | Way | 119/29 |
| 3,853,412 | 12/1974 | Griffin | 128/62 A |
| 4,674,444 | 6/1987 | Axelrod | 119/29.5 |
| 4,802,444 | 2/1989 | Markham et al. | 119/29 |

*Primary Examiner*—John J. Wilson
*Attorney, Agent, or Firm*—Fulwider Patton Reiber Lee & Utecht

[57] ABSTRACT

An annealed Nylon rope formed with one or more knots held by a dog, or by a human, to enable an untwisted tassel portion of the rope to be pulled between a dog's teeth in the manner of dental floss.

8 Claims, 3 Drawing Sheets

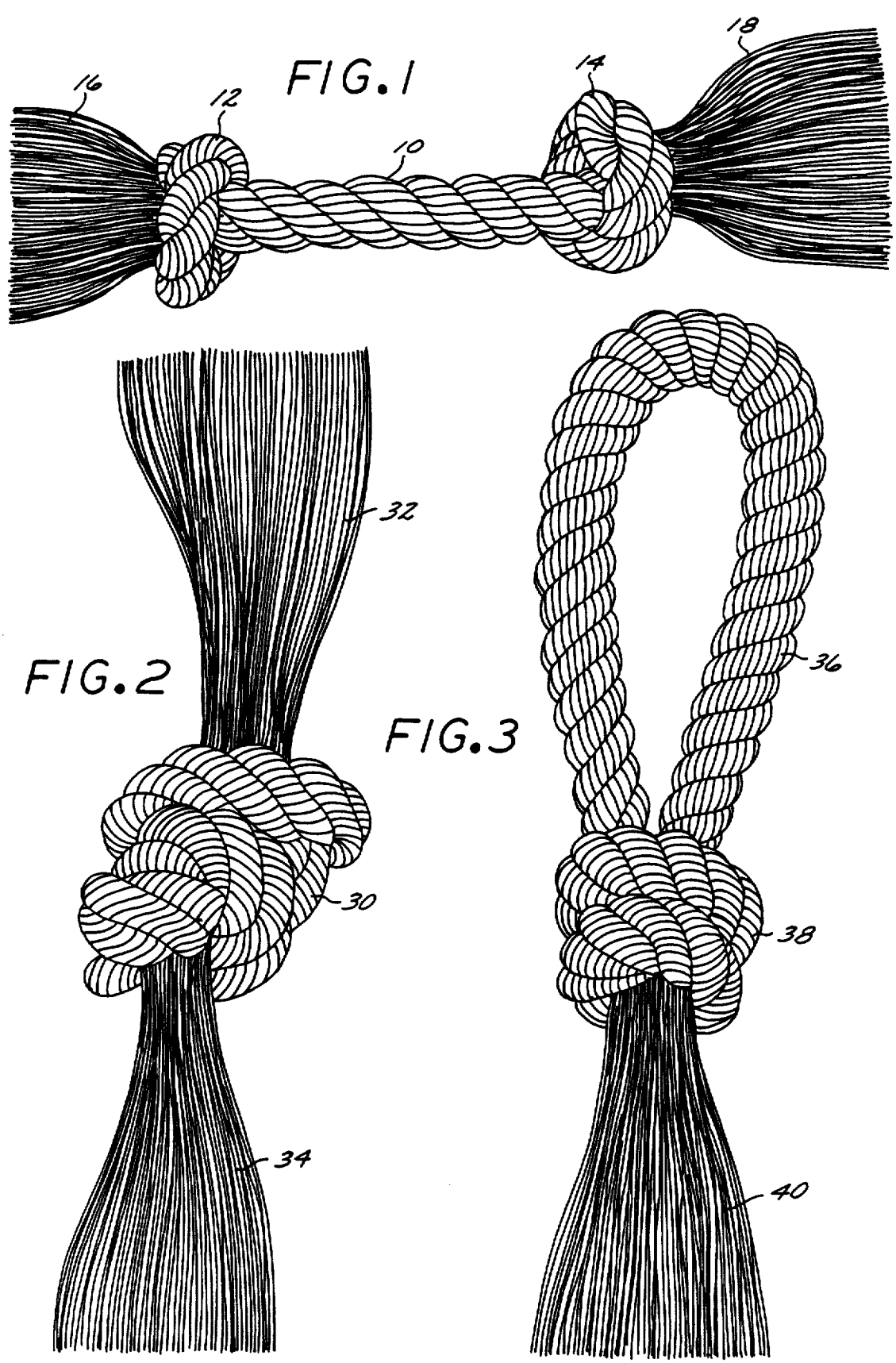

4,924,811

THERAPEUTIC DEVICE FOR CLEANING THE TEETH OF DOGS

BACKGROUND OF THE INVENTION

This invention relates in general to means for cleaning dogs teeth and, more particularly, to a therapeutic device which functions in the same manner as dental floss.

Dogs today, particularly in urban areas, do not have access to natural bones and other hard objects which scour their teeth when chewed.

Although it is claimed that certain hard pet foods when chewed will clean a dogs teeth, such foods generally are consumed by the animal before extensive cleaning of the teeth is accomplished. A variety of artificial chewing toys have been utilized to clean dogs teeth with varying degrees of success. By way of example, artificial chewing toys have been made from rawhide, hard synthetic plastics, and knotted cotton rope. Other than the hard synthetic plastics, however, such materials are ordinarily rapidly destroyed by the dog's chewing action which breaks down the fibers and structure of the material. Cotton rope breaks when it is pulled between a dogs teeth, has a comparatively high coefficient of friction so as to resist sliding between the dogs teeth, and, most importantly, readily absorbs and retains moisture thereby giving bacteria a chance to grow between the dogs teeth.

Accordingly, there exists a definite need for an efficient device for cleaning dogs teeth.

SUMMARY OF THE INVENTION

The present invention provides a length of Nylon rope having a portion that is untwisted to define tassels, with the dog pulling such tassels through his teeth in the manner of dental floss. The processing used to prepare the Nylon rope makes the therapeutic device attractive to dogs and the tassels are both tough and elastic when such tassels are pulled between the dogs teeth as the dog tries to tear the tassels out of the bight portion of the Nylon rope.

The therapeutic device of the present invention includes several variations of knots which will appeal to different dogs and their owners.

Yet another aspect of the present invention is that the therapeutic device can be employed by the dog itself, or such device may be employed by a human and a dog as a pull toy so as to enhance the appeal of the device to the dog while providing the dog with exercise.

BRIEF DESCRIPTION OF THE DRAWINGS

FIG. 1 is a side elevational view of a first form of therapeutic device for cleaning the teeth of dogs embodying the present invention;

FIG. 2 is a side elevational view of second form of said therapeutic device;

FIG. 3 is a side elevational view of a third form of said therapeutic device;

DESCRIPTION OF THE PREFERRED EMBODIMENT

A therapeutic device for cleaning the teeth of dogs embodying the present invention comprises a length of annealed Nylon rope formed at its intermediate portion with knot means, and with the distal portion means of the rope being untwisted to define tassels, with the knot means being held by either a dog or a human as a dog pulls the tassels through the dogs teeth in the manner of dental floss.

Referring to FIG. 1, there is shown a first form of therapeutic device embodying the present invention. Such device includes a length of annealed Nylon rope 10, a pair of knots 12 and 14 tied at the ends of the intermediate bight of the rope portion 10, and the distal portions of the rope being untwisted to define tassels 16 and 18. The tassels 16 and 18 may initially be twisted together, but will become undone after a short period of chewing by a dog. Preferably, the strands of Nylon forming the rope will be comparatively thin having a denier of approximately 2,520 to 840. The Nylon rope should be annealed in a conventional manner and preferably will be processed in accordance with the teachings of my U.S. Pat. No. 3,871,334, issued Mar. 18, 1975, or my U.S. Pat. No. 4,674,444, issued June 23, 1987. When so processed, the strands of the nylon rope will be impregnated with a flavor and scent that appeals to dogs and therefore enhances the likelihood the dog will be attracted to and utilize the therapeutic device.

Figure 6:
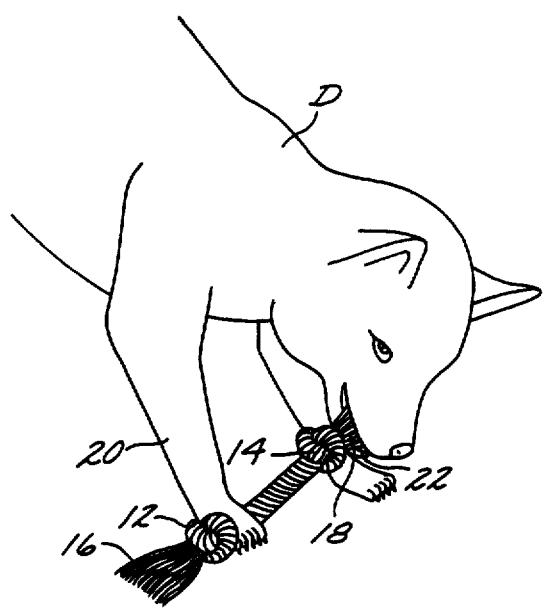
FIG. 6 is a perspective view showing a dog playing with one form of said therapeutic device.
Figure 8:
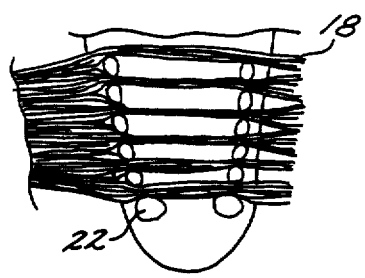
FIG. 8 is a diagrammatic view showing how said therapeutic device functions as dental floss in cleaning a dogs teeth.

Referring to FIG. 6, a dog D is shown playing with a therapeutic device of the form shown in FIG. 1. It will be observed that the dog has placed one of his forepaws 20 on one of the knots 12 and is pulling the tassels 18 between his teeth 22. Referring now additionally to FIG. 8, the tassels 18 are shown passing between the spaces separating the dogs teeth 22. As the tassels are pulled between the dogs teeth the Nylon strands remove destructive plaque and tartar from between the teeth and beneath the gum line where gum disease begins. Since the Nylon is self-lubricating and has a low coefficient of friction, it will easily slide between the dogs teeth, particularly as compared to a fiber such as cotton. Additionally, the Nylon does not support bacterial growth and will not absorb any appreciable amount of water because of the annealing process. It should be particularly noted that the annealed Nylon strands will stretch during their passage between the dogs teeth and accordingly, the therapeutic device will provide a long and useful service life. In general, the therapeutic toy should be replaced when about 50% of the tassels have been torn off. Alternatively, one or more of the knots can be opened and the dog may play with the resulting Nylon rope as long as it stays together.

It should be particularly understood that the therapeutic device for cleaning dogs teeth of the present invention may take forms other than that shown in FIGS. 1 and 6. Thus, referring to FIG. 2, the knot means consist of a single knot 30 formed of the bight portion of the length of rope, with the tassels 32 and 34 extending from either side of knot 30.

In FIG. 3, the bight of the Nylon rope defines a loop 36 which is secured by a knot 38, with the tassels 40 extending away from the side of the knot 38 remote from loop 36.

Figure 7:
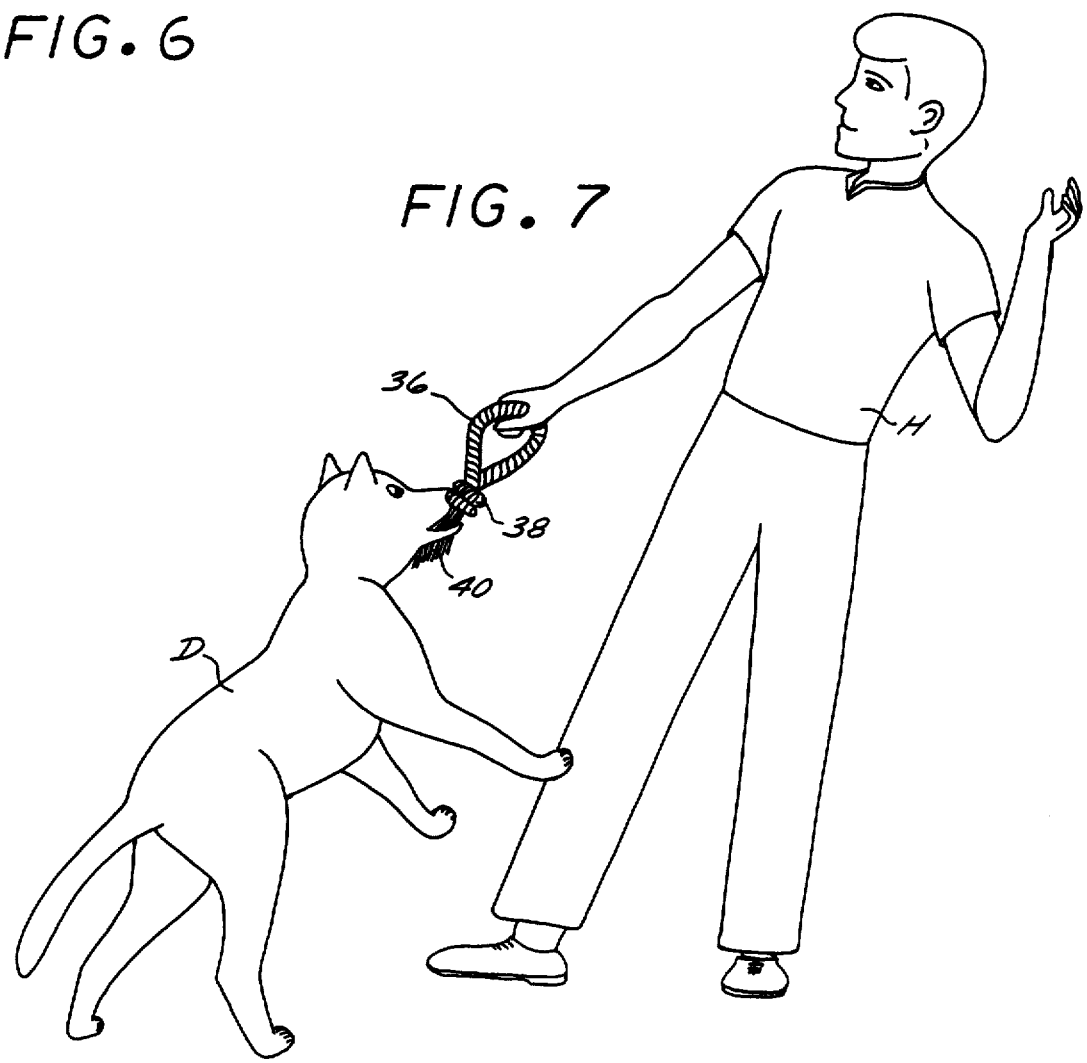
FIG. 7 is a perspective view showing a dog and a human playing with one of said therapeutic devices.

Referring now to FIG. 7, the therapeutic device of FIG. 3 is shown being employed as in the manner of a conventional pull toy. The dog D is shown grasping the tassels 40 between his teeth as the human H holds the loop 36 in one of his hands. This form of the therapeutic device embodying the present invention is particularly attractive to the dog since it involves play with a human. The dog will also be exercised during his play with the pull toy.

Figure 4:
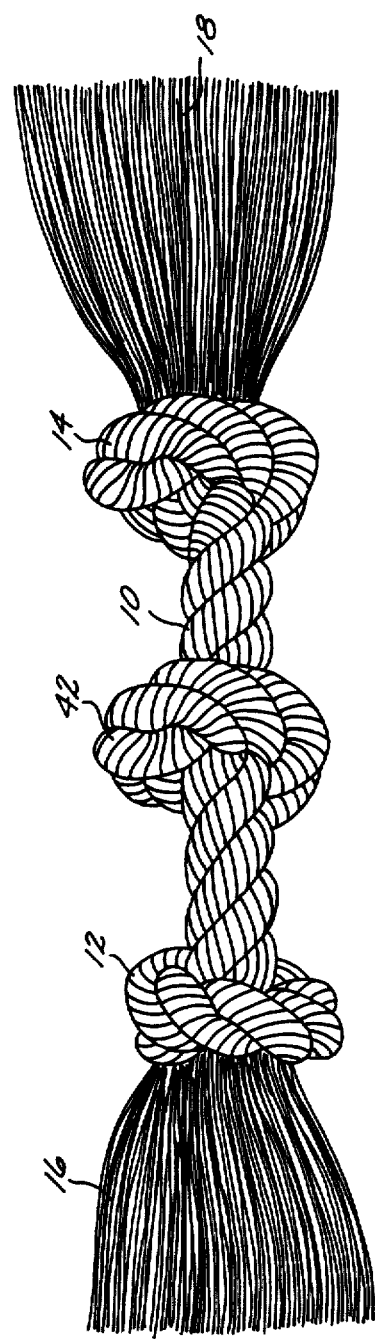
FIG. 4 is a side elevational view of a fourth form of said therapeutic device.

Referring now to FIG. 4, there is shown a fourth form of therapeutic device for cleaning dogs teeth embodying the present invention. This form is similar to the form of FIG. 1 except that a third knot 42 is formed in the bight 10 between the pair of knots 12 and 14. The operation of this embodiment is the same as that of FIG. 1.

Figure 5:
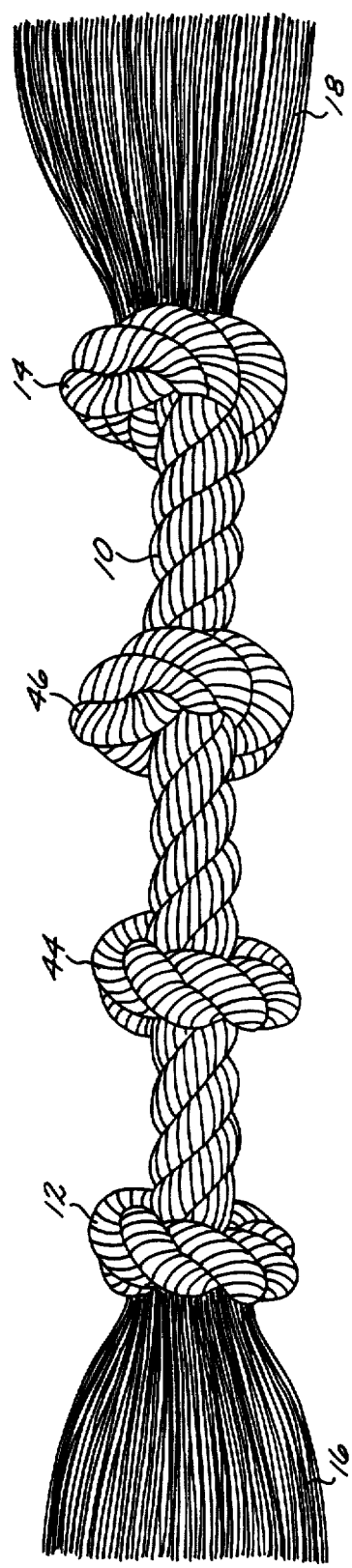
FIG. 5 is a side elevational view of a fifth form of said therapeutic device.

Referring to FIG. 5, there is shown a fifth form of therapeutic device for cleaning dogs teeth embodying the present invention. In this form the device is the same as that shown in FIG. 1 except that a second pair of knots 44 and 46 are formed in the bight 10 between the first pair of knots 12 and 14. Again, the operation of this form of device is similar to that of the device of FIGS. 1 and 4. It should be noted, however, that the devices shown in FIGS. 1, 4 and 5 may also be held by a human so as to serve as a pull toy.

The various forms of the therapeutic device embodying the present invention described hereinabove will remove plaque and tartar which is formed between the dogs teeth. Such devices will provide better results than even hand brushing by means of a toothbrush and paste by the dogs owner. Moreover, these devices divert the dog from destructive chewing behavior possibly involving its owner's personal property, while satisfying the the dog's natural urge to chew.

Various modifications and changes may be made with respect to the foregoing detailed description without departing from the spirit of the present invention.

What is claimed is:

1. A therapeutic device for cleaning the teeth of dogs, comprising: a length of annealed Nylon rope formed by a plurality of strands braided together, said rope including know means disposed at an intermediate portion thereof for providing means to grip said rope, said rope having a distal portion wherein said plurality of strands are unbraided to define a tassel, whereby the knot means is held by a human or by a dog as at least a portion of said strands of said tassel are pulled through spaces between a dog's teeth to thereby clean the teeth by a flowing type action.

2. A therapeutic device for cleaning the teeth of dogs as set forth in claim 1 wherein the knot means include a pair of knots tied at the extremities of a bight of the length of rope, with the distal portion extending from the side of said knots.

3. A therapeutic device for cleaning the teeth of dogs as set forth in claim 2 wherein a third knot is formed in the bight of the rope between the pair of knots.

4. A therapeutic device for cleaning the teeth of dogs as set forth in claim 2 wherein a second pair of knots is formed in the bight of the rope between the pair of knots.

5. A therapeutic device for cleaning the teeth of dogs as set forth in claim 1 wherein the knot means consists of a single knot formed of a bight portion of the length of rope, with the distal portion extending from the sides of said knot.

6. A therapeutic device for cleaning the teeth of dogs as set forth in claim 1 wherein a bight of the rope defines a loop which is secured by the knot means, with said tassel of said distal portion extending from the knot means.

7. A therapeutic device for cleaning the teeth of dogs as set forth in claim 6 wherein the Nylon rope has been impregnated with a flavor and scent that appeals to dogs.

8. A therapeutic device for cleaning the teeth of dogs as set forth in claim 1 wherein the Nylon rope has been impregnated with a flavor and scent that appeals to dogs.

* * * * *

UNITED STATES PATENT AND TRADEMARK OFFICE
CERTIFICATE OF CORRECTION

PATENT NO. : 4,924,811

DATED : May 15, 1990

INVENTOR(S) : Herbert R. Axelrod

It is certified that error appears in the above-identified patent and that said Letters Patent is hereby corrected as shown below:

In Claim 1, Column 4, Line 3,

"know" should be "knot"

Signed and Sealed this

Eighth Day of September, 1992

Attest:

DOUGLAS B. COMER

*Attesting Officer*  *Acting Commissioner of Patents and Trademarks*